INVENTORS.
VICTOR C. ANDERSON
V. H. SCHMIDTMANN
BY
ATTORNEY.

United States Patent Office 3,454,286
Patented July 8, 1969

---

3,454,286
THERMALLY OPERATED RELEASE MECHANISM
Victor C. Anderson, San Diego, and Victor H. Schmidt-
mann, La Mesa, Calif., assignors, by mesne assignments,
to the United States of America as represented by the
Secretary of the Navy
Filed Mar. 1, 1967, Ser. No. 620,219
Int. Cl. F16b 7/00; F16d 1/00
U.S. Cl. 285—21                                    5 Claims

---

ABSTRACT OF THE DISCLOSURE

The present invention is a thermally operated release mechanism, which may be substituted for previously used explosive bolt release mechanisms, to separate elements such as a cable from a payload. The invention may include a pair of separable hollow bodies, which are notched at their interior surfaces, with a fusible material disposed in the hollow bodies as well as the notches to retain the bodies one to the other. Upon applying sufficient heat to the fusible material this material will melt and the bodies can be separated to release elements attached thereto. The invention may further include a means for melting the fusible material.

---

The explosive bolt technique has been th primary meth-method for releasing elements at some remote location, such as between a surface vessel and some depth within the ocean. While release devices employing the explosive bolt technique have been satisfactory in effecting a release of elements, they have several serious disadvantages. One disadvantage has been the high risk of injury to personnel who handle these explosive bolt devices. Explosive bolts are very sensitive and the U.S. Navy has experienced serious injury to some of its personnel during the handling of such devices. Another disadvantage in explosive bolt release devices has been the damage to attached elements due to the shrapnel thrown from the release device upon its actuation. This shrapnel can very easily destroy sensitive components carried by the release device, such as oceanographic equipment. Even though these problems have been recognized there have been no satisfactory solutions.

The present invention utilizes heat to melt a fusible material which upon melting releases a pair of separable bodies. This then causes the elements which are attached to these bodies to likewise be released. Each of the separable bodies is hollow and has an interior surface which is notched or provided with ribs. The fusible material may be disposed within the hollow portion and the notch of each of the bodies so as to retain the bodies together. The invention further includes a means for melting the fusible material to bring about a release of the attached elements.

An object of the present invention is to provide a remotely operable release mechanism which does not require the use of an explosive bolt.

A further object is to provide an effective release mechanism which is safe to handle and will not cause shrapnel upon its actuation.

Still a further object is to provide a remotely operable thermally actuated release mechanism which is safe to handle and low in cost.

Other objects, advantages and novel features will become more apparent from the following detailed description of the invention when considered in conjunction with the accompanying drawing wherein.

Figures 1, 2:
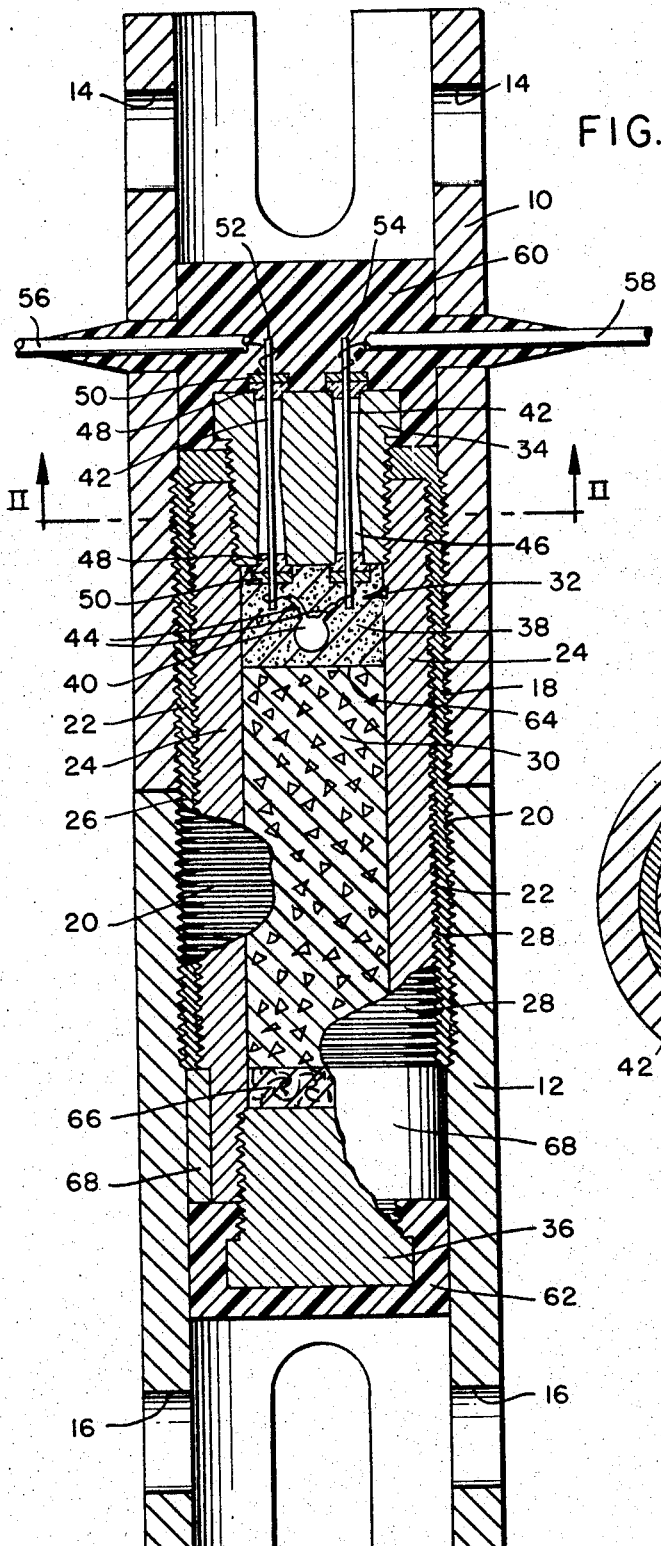
FIG. 1 is a longitudinal cross sectional view of the present invention.
FIG. 2 is a transverse cross sectional view taken along plane II—II of FIG. 1.

Referring now to the drawing wherein like reference numerals designate like or similar parts there is shown in FIG. 1 a pair of separable hollow bodies which may comprise a top elongated tube 10 and a bottom elongated tube 12. Each of these tubes may have substantially the same internal diameter and may be aligned substantially along their longitudinal axes with their ends engaging one another or in near engagement as shown in FIG. 1. In this position the hollow portions of the tubes 10 and 12 are in communication with one another for a purpose to be explained hereinafter. The opposite ends of the tubes 10 and 12 may be provided with openings 14 and 16 for receiving a cable (not shown) and a payload (not shown) respectively.

It is desirable that the tubes 10 and 12 be retained with high structural integrity and then released from one another without any shrapnel effect. This may be accomplished by providing the interior surfaces of each of the tubes 10 and 12 with a notch or serrations 18 and 20, respectively, along its longitudinal axis and a fusible material such as sulphur 22 which is disposed within the hollow portions and the notches or serrations of the tubes. The sulphur material 22 in its hardened condition latches within the serrations 18 and 20 to hold the tubes together but upon application of sufficient heat will melt to cause the tubes to become separable. The serrations 18 and 20 may be a series of annular V-shaped notches as shown in FIG. 1. The use of sulphur as the fusible material for first retaining the tubes 10 and 12 and then releasing them provides surprising results in that the sulphur bonds itself to the interior surfaces of the tubes with a high strength retaining force in its cold condition and yet when melted with sufficient heat the tubes are quickly and easily separable. It is to be noted that the top of the V of each of the notches 18 and 20 provides an annular shear plane across which the sulphur material 22 is located. We have found the shear strength of a cold sulphur material across these planes to be in the order of 1000 p.s.i.

In the preferred embodiment of the present invention an interior tube 24 is disposed within each of the pair of tubes 10 and 12 and is substantially aligned longitudinally therewith so as to form an annular space 26 therebetween. This annular space 26 may then be filled with the sulphur material 22 as shown in FIG. 1. Additional retaining power between the tubes 10 and 12 may be accomplished by providing the exterior surface of the interior tube 24 with notches or serrations 28 as shown in FIG. 1. Similar to the serrations 18 and 20 of the tubes 10 and 12, the serrations 28 of the interior tube 24 may comprise a series of V-shaped notches which extend circumferentially about the interior tube. The sulphur material 22 is recessed within the serrations 28 and provides a series of high strength shear planes as discussed hereinabove.

It is desirable that the release mechanism be self-contained with a means for melting the sulphur material 22 so that the release mechanism can be operated from a remote location. Such a heating means would become especially useful when it is desired to release a piece of oceanographic equipment from a cable when an electrical signal is transmitted to the release mechanism. The means for melting the sulphur material 22 may include a quantity of combustible material, such as Thermite 30, disposed within the interior tube 24 along with an electrically responsive ignitor means which is also disposed within the interior tube 24 for igniting the combustible material. The ignition of the combustible material 30 will cause a tremendous heat within the tube 24 so as to heat the wall of this tube and melt the sulphur material 22. The top and bottom ends of the interior tube 24 may be sealed with respective plugs 34 and 36 which are threaded internally within the tube. Immediately below the top plug 34 may be a small quantity of starting Thermite material 38. The means for igniting the starting Thermite may include a squib 40, which is disposed within the starting Thermite material 38, and a pair of electrically conductive rods 42 which extend through the top plug 34 and are connected at their bottom ends to squib leads 44. The electrical rods 42 may be sealed within the plug 34 by an epoxy filler disposed within the plug 34 and located between top and bottom washers 48 and top and bottom nuts 50 which are threaded onto the rods 42.

In order to provide for remote operation of the release mechanism the rods 42 may extend upwardly from the top nuts 50 to provide terminals 52 and 54 which are connected to electrical cables 56 and 58 repectively. The cables 56 and 58 may extend to a remote location where a signal can be applied for actuating the squib 40. In order not to interfere with elements which may be attached to the top tube 10 through the openings 14 we have found it desirable to extend the cables 56 and 58 transversely through the wall of the tube 10. As shown in FIG. 1, each cable may extend through diametrically opposite wall portions of the tube 10 after which the cables 56 and 58 may be directed toward the remote operating station.

For oceanography work we have found it desirable to hermetically seal the interior tube 24 and its attached components within the pair of tubes 10 and 12. This may be accomplished by a top and bottom seal 60 and 62 respectively. The top seal 60 may surround the top of the interior tube 24, the top of the plug 34, the terminals 52 and 54, and surround the cables 56 and 58 as they extend through the walls of the top tube 10. The bottom seal 62 may surround the bottom of the interior tube 24 as well as the bottom of the plug 36. The top and bottom seals 60 and 62 may be constructed of any suitable sealant material such as polyurethane. With such an arrangement the release mechanism can be thrown into the ocean and will be protected from the water environment.

Incidental components of the relase mechanism may include a thin disc like seal 64, which separates the top of the Thermite material 30 from the starter Thermite material 38 and a disc like insulator 66 which insulates the bottom of the Thermite material 30 from the plug 36. The seal 64 may be constructed of a thin piece of aluminum and the insulator 66 may be constructed of mineral wool. Further, a bottom portion of the interior tube 24 may be provided with a reduced diameter to receive a ring 68 which annularly spaces the interior tube 24 within the pair of tubes 10 and 12 to provide a uniform annular space 26 for receiving the sulphur material 22.

The construction of the release mechanism is quite simple. After the interior tube 24 is annularly spaced within the pair of tubes 10 and 12 by the ring 68, melted sulphur may be poured in from the top of the interior tube to fill within all of the serrations and the annular space 26. In order to keep the sulphur in a melted condition so as to fill in all voids it may be desirable to preheat all of the tubes. After the sulphur has cooled the combustible material 30 may be inserted within the interior tube 24 along with the other components shown within this tube.

Operation

In the operation of the release mechanism a station, such as an ocean going vessel applies an electrical current to the squib 40 through the electrical cables 56 and 58. This electrical current causes the squib 40 to detonate which in turn causes the combustion of the starting Thermite material 38. The starting Thermite material 38 burns through the thin aluminum disc 64 to ignite the Thermite material 30 which in turn heats the interior tube 24 to melt the sulphur material 22. The melting of this sulphur material breaks the retention between the tubes 10 and 12 and allows them to be separated. A payload (not shown) attached to the bottom tube 12 will quickly pull this tube from the top tube 10 and release the payload from a cable (not shown) attached to the top tube 10.

It is now readily apparent that the present invention provides a very unique release mechanism which overcomes the hazards associated with previously used explosive bolt release devices. With the teachings of the present invention release mechanisms can now be provided which can be handled without hazard to personnel and which can be operated without the danger of shrapnel damaging surrounding equipment.

We claim:

1. A thermally operated release mechanism comprising:
    inner and outer spaced and concentrically disposed elongate tubes each being provided with a plurality of ribs projecting into said space provided between said tubes,
    said outer tubes being formed of two axially separable sections,
    a meltably heat-responsive solid nonaqueous chemical material substantially filling said space in intimate contact with said ribs for interlocking said separable sections,
    a combustible material filling at least a portion of the bore of said inner tube, and
    means carried by said mechanism in close proximity to said combustible material for igniting said material and thus causing said chemical to melt and release its interlock of said separable sections.

2. The mechanism of claim 1 wherein said ignition means is formed of an electrically-responsive ignitor, and of a remotely-controllable means for electrically energizing said ignitor.

3. The mechanism of claim 1 wherein one of said axially separable sections of said outer tube is provided with means adapted for attachably receiving a suspension line, and
    the other of said axially separable sections is provided with means adapted for attachably receiving a load.

4. The mechanism of claim 1 wherein said ribs are thread-like in form.

5. The mechanism of claim 1 further including means for sealing said combustible material and said ignition means within said tubes.

References Cited

UNITED STATES PATENTS

| | | | |
|---|---|---|---|
| 310,049 | 12/1884 | Granger | 285—284 |
| 1,818,485 | 8/1931 | Lambert | 285—21 X |
| 2,745,368 | 5/1956 | Klein | 285—21 X |
| 2,992,017 | 7/1961 | Dritz | 285—22 |
| 3,094,452 | 6/1963 | Von Riegen et al. | 285—21 X |
| 3,171,180 | 3/1965 | Allison | 24—123 |
| 3,200,706 | 8/1965 | Kinard | 89—1.01 |
| 3,242,666 | 3/1966 | Peterson | 60—26.1 |

FOREIGN PATENTS

| | | |
|---|---|---|
| 148,457 | 9/1952 | Australia. |
| 26,644 | 1898 | Great Britain. |
| 748,454 | 5/1956 | Great Britain. |
| 904,667 | 8/1962 | Great Britain. |

CARL W. TOMLIN, *Primary Examiner.*

D. W. AROLA, *Assistant Examiner.*

U.S. Cl. X.R.

24—201; 85—1; 285—328, 370, 289, 292; 287—119; 294—83